May 16, 1933. J. B. COFFRON 1,908,958
AUTOMOBILE DOORLOCK
Filed April 13, 1929
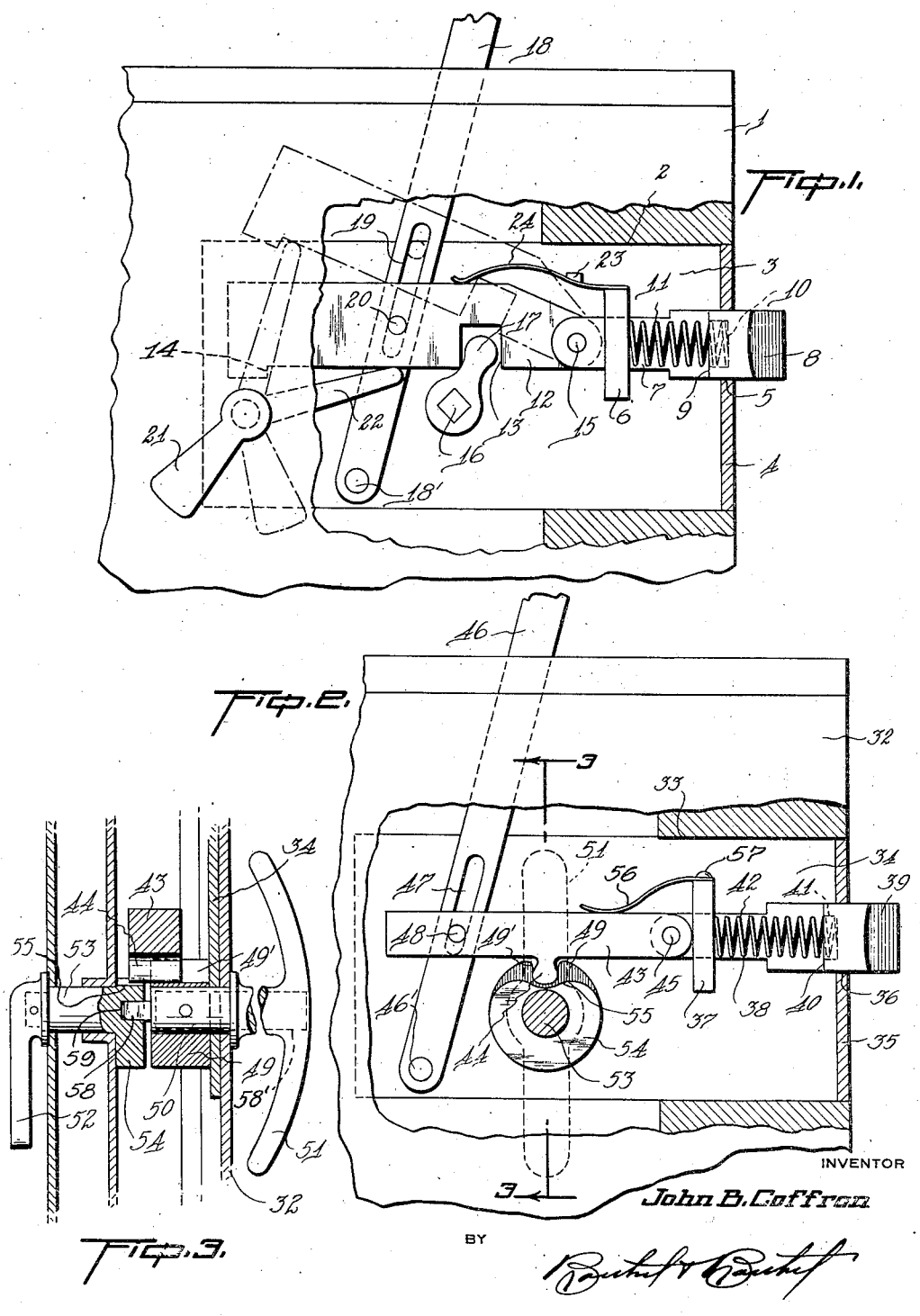
INVENTOR
John B. Coffron Patented May 16, 1933

1,908,958

UNITED STATES PATENT OFFICE

JOHN B. COFFRON, OF DETROIT, MICHIGAN

AUTOMOBILE DOORLOCK

Application filed April 13, 1929. Serial No. 354,748.

The present invention pertains to a novel locking mechanism, particularly referring to that class of automobile door locking mechanisms which are manipulated from the interior of the automobile to prevent the outside handle from operating the latch and permitting the door to open.

The primary object of the present invention is to devise an automobile door lock which may be manipulated from the interior of the automobile to render the outside handle free to rotate without functioning as a means for withdrawing the latch. This lock is primarily intended for doors locked from the inside, it being customary in the present day door construction for automobiles that only one of the doors is unlocked from the outside. The present lock employs a novel tripping mechanism operated by a lever extending inside the automobile and may also be operated from the outside by incorporating any suitable locking mechanism on the market at present for the purpose of operating the trip mechanism.

Ordinary locking mechanisms employed for locking automobile doors, when in the locked position merely prevent the outside handle from turning. It is well known to be a common expedient of automobile thieves to employ an ordinary gas pipe and insert it over the end of the handle and apply sufficient leverage to twist it off or break the lock. This problem stimulated the conception of the present device in which a novel mechanism is employed to trip the end of a lever pivoted to the latch whereby the lever is moved out of engagement with the handle projecting on the outside of the automobile, the handle thereby being left free to rotate.

With these and other objects in view my invention is fully set forth and more particularly pointed out in the appended claim reference being had to the accompanying drawing, in which Figure 1 is a fragmentary view of an automobile door with a portion broken away to illustrate the locking mechanism;

Figure 2 is a fragmentary view of an automobile door with a portion broken away to show a slightly modified form of my invention, and Figure 3 is a cross sectional view on the line 3—3 of Figure 2.

Like characters are employed to indicate the corresponding parts throughout.

In reference to Figure 1 the numeral indicates a fragment of an automobile door having a cavity or recess 2 in which is inserted a plate 3 having a flange 4 provided with a latch bolt opening 5. A strap 6 is secured to the plate 3 to support the reduced end 7 of a latch bolt 8 having a shoulder 9 drilled as at 10 to provide a seat for a coiled spring 11 exerting pressure between the head of the latch bolt and the strap whereby the latch bolt is normally held projecting through the opening 5. A latch bolt lever 12 having a notch 13 and a shoulder 14 is pivoted as at 15 to a reduced portion of the latch bolt 8.

Extending throughout the outside of the door and adapted to support a handle is provided a shaft 16, the inner end being squared to support a lever 17 which projects into the notch 13 in the latch bolt lever 12. A lever 18 pivoted as at 18' extends upwardly into the interior of the automobile and is provided with a slotted opening 19 into which a pin 20 carried by the latch bolt lever 12 extends. A lever 21 rotatably mounted on the inside of the door is provided with an integral arm 22 adapted to support the pivoted latch bolt lever 12. The plate 3 is further provided with a lug 23 which serves to maintain a spring 24 in a position with one end resting on the upper part of the strap 6 and the other end exerting pressure downwardly upon the pivoted latch bolt lever 12.

In operation the shaft 16 is rotated by the handle on the outside of the automobile which causes the lever 17 to engage the side of the notch 13, and thereby withdraw the latch bolt to permit the door to open. Likewise the latch bolt may be drawn by swinging the lever 18 so that the pin 20 extending into the slot 19 causes the latch bolt to be withdrawn. To lock the mechanism the lever 21 is swung in a counterclockwise direction which causes the arm 22 to raise or trip the latch bolt lever 12 to the position shown in dotted lines, in which position, the lever 17 no longer engages in the notch 13 and the handle on the outside of the automobile is therefore free to rotate without affecting the latch bolt 8.

In Figures 2 and 3 the numeral 32 indicates a door having a cavity or recess 33 in which the plate 34 is inserted, a flange 35 having a latch bolt opening 36 formed on the plate 34. A strap 37 supports the reduced portion 38 of the latch bar 39 which has a shoulder 40 drilled as at 41 to provide a seat for a coiled spring 42 adapted to abut against the strap 37 to hold the latch bar 39 in an outwardly extending position. The latch bolt lever 43 has a downwardly extending lug 44 and is pivoted as at 45, to the reduced portion 38 on the latch bolt.

A lever 46 is pivoted as at 46' to the plate 34 and has a slot 47 in which extends a pin 48 carried by the latch bolt lever 43, the upper end of the lever 46 extending upwardly into the interior of the automobile.

A disk 49 which is substantially circular in form and provided with a notch 49' is mounted on a stub shaft 50 which extends through the outer wall of the door and has a handle 51 mounted on the outer end thereof. 52 is a handle mounted on a stub shaft 53 in such a manner that the handle extends into the interior of the automobile. On the inner end of the stub shaft 53 is formed a head having a circular portion 54 and a flattened cam portion 55. A spring 56 is secured upon the strap 37 by means of a screw 57 to normally exert downward pressure on the latch bolt lever 43.

In the operation of this embodiment the handle 51 is rotated which causes the sides of the notch 49 to engage the lug 44 and withdraw the latch bolt 39 to permit the door to open. Likewise the latch bolt 39 may be withdrawn by swinging the lever 46 which has the walls of slot 47 engaging the pin 48 in the latch bolt lever 43. To lock this construction the lever 52 is rotated in any direction which causes the cam portion 55 to engage the lug 44 and raise it until it rests upon the circular portion 54 and thereby moves it out of the slot 49' in which position the outside handle 51 is free to rotate without affecting the latch bolt 39.

The purpose of the slots 19 and 47 in the levers 18 and 46 respectively, is that these levers which extend into the interior of the automobile are always in connection with the latch bolt so that the door may be opened from the inside of the automobile regardless of whether the outside handle is locked or not.

To convert the above described locking mechanism into one which may be unlocked from the outside of the vehicle the stub shaft 50 is formed as a sleeve in which is inserted a barrel shaped locking mechanism 58' having a squared stem 58. The stem 58 projects into a squared opening 59 in stub shaft 53 whereby a connection is provided to rotate the head on the end of the stub shaft 53 to unlock or trip the mechanism so that the handle 51 may be employed to withdraw the latch bolt 39.

Although specific embodiments of my invention have been illustrated and described it is to be understood that various alterations may be made in the details of construction without departing from the spirit of the invention as depicted in the following claim.

What I claim is:—

A lock mechanism comprising a bracket adapted to be attached to a door, a latch bolt having a portion slidably received in said bracket and extending outwardly on each side thereof, a head formed on one end of said latch bolt, a coiled spring interposed between said head and said bracket, a latch bolt lever pivotally mounted on the opposite end of said latch bolt and having a notch formed in the bottom thereof, a rotatable lever mounted adjacent the notch in said latch bolt lever, a leaf spring mounted on said bracket and normally forcing said latch bolt lever into contact with said rotatable lever so that the latter may enter said notch, a shoulder formed on the outer end of the latch bolt lever, and an arm rotatably mounted adjacent the outer end of said latch bolt lever and adapted to engage the same whereby rotation of said arm raises said latch bolt lever, said arm having its axis of rotation located so that contact of the arm with said shoulder causes said latch bolt lever to be latched in a position wherein engagement is broken between the notch and the rotatable lever.

In testimony whereof I affix my signature.

JOHN B. COFFRON.